United States Patent
Yu et al.

(10) Patent No.: US 8,447,310 B2
(45) Date of Patent: May 21, 2013

(54) APPARATUS AND METHOD FOR INTERFERENCE CANCELLATION IN BROADBAND WIRELESS COMMUNICATION SYSTEM

(75) Inventors: Tak-Ki Yu, Yongin-si (KR); Cheol-Woo You, Seoul (KR); Young-Ho Jung, Seoul (KR); Sang-Min Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1595 days.

(21) Appl. No.: 11/936,544

(22) Filed: Nov. 7, 2007

(65) Prior Publication Data

US 2008/0108363 A1 May 8, 2008

(30) Foreign Application Priority Data

Nov. 7, 2006 (KR) .................... 10-2006-0109261

(51) Int. Cl.
*H04W 72/00* (2009.01)
*H04M 11/00* (2006.01)

(52) U.S. Cl.
USPC .......................................... 455/450; 455/403

(58) Field of Classification Search
USPC ... 455/114.2, 450; 375/267, 240.01; 370/329, 370/328, 336
See application file for complete search history.

(56) References Cited

U.S. PATENT DOCUMENTS

| | | | | |
|---|---|---|---|---|
| 2002/0044614 A1* | 4/2002 | Molnar et al. | ................ | 375/346 |
| 2005/0250506 A1* | 11/2005 | Beale et al. | ................ | 455/452.1 |
| 2005/0265222 A1* | 12/2005 | Gerlach | ........................ | 370/208 |
| 2005/0272403 A1* | 12/2005 | Ryu et al. | ...................... | 455/403 |

FOREIGN PATENT DOCUMENTS

KR    1020060097450    9/2006

* cited by examiner

*Primary Examiner* — Kiet Doan
(74) *Attorney, Agent, or Firm* — The Farrell Law Firm, P.C.

(57) ABSTRACT

An Apparatus and a method for interference cancellation in a wireless communication system are provided. When a resource of an Interference Cancellation (IC) zone is allocated to a terminal traveling in a service coverage, resource allocation information relating to an IC zone of neighbor cells is gathered. Resource allocation information is generated relating to the resource allocated to the terminal comprising resource allocation information of the IC zone of the neighbor cells. The resource allocation information relating to the resource allocated to the terminal is transmitted to the terminal. Accordingly, when the interference is present, the interference cancellation is carried out to reduce the load on the terminal and enhance the reception performance.

15 Claims, 12 Drawing Sheets

APPARATUS AND METHOD FOR INTERFERENCE CANCELLATION IN BROADBAND WIRELESS COMMUNICATION SYSTEM

PRIORITY

This application claims priority under 35 U.S.C. §119(a) to an application filed in the Korean Intellectual Property Office on Nov. 7, 2006 and assigned Serial No. 2006-0109261, the disclosure of which are incorporated herein by reference.

BACKGROUND OF THE INVENTION

1. Field of the Invention

The present invention relates generally to an apparatus and method for canceling interference of a neighbor cell in a wireless communication system, and more particularly, to an apparatus and method for canceling neighbor cell interference according to whether a neighbor cell interference signal is generated in the wireless communication system.

2. Description of the Related Art

A wireless communication system shares frequency resources between cells to raise frequency resource utilization. When cells of the wireless communication system share frequency resources, the wireless communication system is subject to performance degradation due to neighbor cell interference. In the wireless communication system, the performance degradation caused by neighbor cell interference seriously affects a terminal traveling in a cell boundary. Therefore, it is necessary for the wireless communication system to cancel the neighbor cell interference to mitigate performance degradation.

In order to cancel neighbor cell interference, the terminal in the wireless communication system should have knowledge of information relating to the interfering neighbor cell and Modulation and Coding Scheme (MCS) format information of an interference signal received from the neighbor cell.

For example, the terminal can acquire the neighbor cell information while searching for candidate cells for active set management. The terminal can acquire the MCS format information of the interference signal by decoding a signal received through a control channel of the interfering neighbor cell. Herein, the active set indicates a set of neighbor cells to which the terminal can hand over.

As discussed above, the terminal of the wireless communication system decodes the signal received through the control channel of the neighbor cell to acquire the MCS format information of the interference signal. However, when the terminal decodes the signal received through the control channel of the neighbor cell while communicating with a serving cell, the decoding operation imposes a considerable burden on the terminal.

SUMMARY OF THE INVENTION

The present invention has been made to address at least the above-mentioned problems and/or disadvantages and to provide at least the advantages below. Accordingly, an aspect of the present invention is to provide an apparatus and a method for constituting resource allocation information, which indicates presence of an interference signal of an interference cancellation zone to cancel interference according to whether there the interference signal exists in a wireless communication system.

Another aspect of the present invention is to provide an apparatus and a method for determining whether an interference signal exists in an interference cancellation zone in a wireless communication system enabling inter-signaling.

A further aspect of the present invention is to provide a resource allocation information constituting apparatus and method for determining whether an interference signal exists in an interference cancellation zone in a wireless communication system disabling inter-signaling.

According to an aspect of the present invention, an operating method of a Base Station (BS) for interference cancellation in a wireless communication system is provided. When a resource of an Interference Cancellation (IC) zone is allocated to a terminal traveling in a service coverage, resource allocation information relating to an IC zone of neighbor cells is gathered. Resource allocation information is generated relating to the resource allocated to the terminal. The resource allocation information comprises resource allocation information of the IC zone of the neighbor cells. The resource allocation information relating to the resource allocated to the terminal is transmitted to the terminal.

According to another aspect of the present invention, an operating method of a terminal for interference cancellation in a wireless communication system is provided. When resource allocation information relating to an IC zone is received from a serving cell, an IC resource allocated from the serving cell is confirmed based on the resource allocation information. It is determined whether a neighbor cell exists that uses the same resource as a resource allocated from the serving cell, based on the resource allocation information. When the neighbor cell exists that uses the same resource as the resource allocated from the serving cell, interference is cancelled.

According to a further aspect of the present invention, an operating method of a BS for interference cancellation in a wireless communication system is provided. When an IC zone resource is allocated to a terminal traveling in a service coverage, resource allocation information of the IC zone is confirmed. The resource allocation information of the IC zone and resource allocation information relating to the resource allocated to the terminal are generated. The resource allocation information of the IC zone and the resource allocation information relating to the resource allocated to the terminal are sent.

According to a further additional aspect of the present invention, an operating method of a terminal for interference cancellation in a wireless communication system is provided. An IC zone resource allocated from a serving cell is confirmed using IC zone resource allocation information received from the serving cell. Resource allocation information of an IC zone of neighbor cells is confirmed using control signals received at the serving cell from the neighbor cells. It is determined whether a neighbor cell exists that uses the same resource as a resource allocated from the serving cell. When the neighbor cell exists that uses the same resource as the resource allocated from the serving cell, interference is cancelled.

According to yet another aspect of the present invention, a wireless communication system for interference cancellation is provided, which includes a BS for allocating resources of an IC zone by scheduling according to scheduling information of terminals in a service coverage. The system also includes a terminal for canceling the interference, when the resource of the IC zone is allocated and the terminal is interfered by neighbor cells according to resource allocation information of an IC zone of the neighbor cells.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
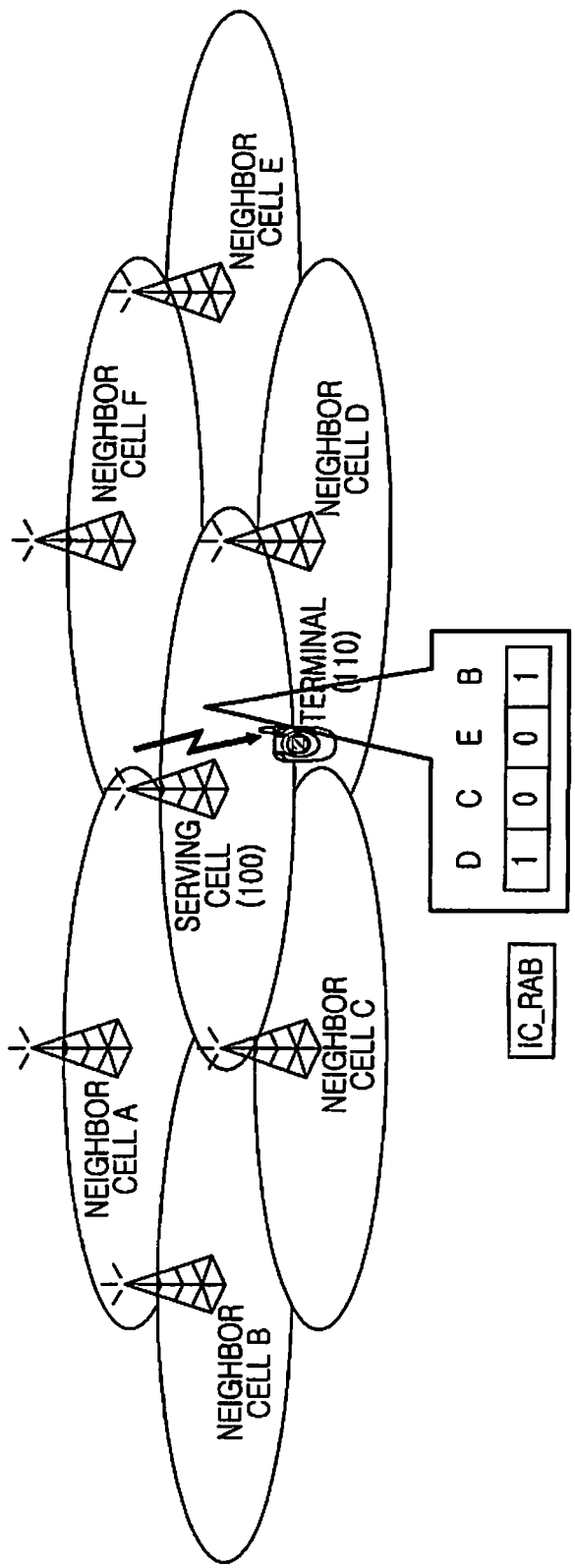
FIG. 1 is a diagram illustrating construction to determine whether an interference signal exists in a wireless communication system enabling inter-signaling according to an embodiment of the present invention.

Preferred embodiments of the present invention are described in detail below with reference to the accompanying drawings. Detailed descriptions of constructions or processes known in the art may be omitted to avoid obscuring the subject matter of the present invention.

The present invention provides a resource allocation information constituting technique for determining whether an interference signal exists from a neighbor cell in a wireless communication system.

In the following explanation, while the wireless communication system adopts an Orthogonal Frequency Division Multiple Access (OFDMA) scheme by way of example, the present invention is also applicable to wireless communication systems adopting other communication schemes.

It is required for a terminal in the wireless communication system needs to have knowledge of Modulation and Coding Scheme (MCS) format information of an interference signal received from a neighbor cell in order to cancel neighbor cell interference. The wireless communication system sets an Interference Cancellation (IC) zone where an MCS format is fixed in order to reduce an operation load, which increases when the terminal acquires the MCS format information of the interference signal. Herein, the IC zones of cells in the wireless communication system are the same. The IC zone can be constituted using a Time Division Multiplexing (TDM) scheme and a Frequency Division Multiplexing (FDM) scheme.

The wireless communication system allocates terminals, which travel in a cell boundary, interfere with a neighbor cell, and are interfered with by the neighbor cell, to the IC zones. Since those terminals traveling in the cell boundary where the interference from the neighbor cell is great are limited to a low MCS level, the terminals in the cell boundary can be allocated to the IC zones.

As discussed earlier, the wireless communication system fixes an MCS format of the interference signal using the IC zone. In detail, the wireless communication system fixes the MCS format of the interference signal by allocating resources of the IC zone to the terminals, which interfere with the neighbor cell and are interfered with by the neighbor cell. Thus, the terminal allocated to the IC zone can remove the neighbor cell interference because the neighbor cell can acquire the MCS format information of the terminal allocated to the IC zone.

In the wireless communication system, the terminal allocated to the IC zone is interfered with by the neighbor cell and thus cancels the interference. However, when there is no another terminal using the same resource in the neighbor cell and the terminal is not interfered with by the neighbor cell, the interference cancellation is unnecessary.

Accordingly, the terminal needs to perform the interference cancellation by determining whether there is an interference signal of the neighbor cell. That is, the terminal needs to selectively cancel the interference by checking whether a terminal exists that uses the same terminal based on the IC zone resource allocation information of the neighbor cell.

The cells of the wireless communication system constitute a resource allocation information block of the IC zone as shown in Table 1 so that the terminals allocated to the IC zone of the neighbor cell can determine whether an interference signal of the terminals allocated to its IC zone exists. Apart from the resource allocation information block of the terminals for the entire radio resource, the cells constitute a resource allocation information block of the IC zone. Herein, the resource allocation information block of the terminals for the entire radio resource indicates a MAP block of Institute of Electrical and Electronics Engineers (IEEE) 802.16 system or a LAP block of IEEE 802.20 system. Hereafter, the resource allocation information block of the terminals for the entire radio resource is referred to as a Resource Assignment Block (RAB) and the resource allocation information block of the IC zone is referred to as an IC_RAB.

Descriptions are provided of techniques for the terminal to determine whether the neighbor cell interference signal exists in a case where inter-signaling is allowed and in a case where inter-signaling is not allowed in the wireless communication system.

TABLE 1

| Resource allocation information block name | Header | Length | Field |
|---|---|---|---|
| RAB | 0000 | Fixed length | MAC_ID<br>Resource_ID<br>MCS_Format<br>System_Reserve |

TABLE 1-continued

| Resource allocation information block name | Header | Length | Field |
|---|---|---|---|
| IC_RAB | 0002 | Fixed length | MAC_ID<br>Resource_ID<br>Interfering_Cell_Inform<br>(or IC_Zone_Sub_Load_Inform)<br>Operation_Mode_Ind<br>System_Reserve |
| IC_BIT | 0001 | Fixed length | MAC_ID<br>IC_Zone_Load_Inform<br>system_Reserve |

In Table 1, the RAB carries the allocation information of the entire radio source. Accordingly, the RAB includes a MAC_ID field indicative of ID of the terminal allocated the resource or ID of the grouped terminal, a Resource_ID field indicative of the resource allocated to the terminal, and an MCS_Format field indicative of the MCS format information of the allocated resource.

IC_RAB in Table 1 carries the resource allocation information of the IC zone. Accordingly, the IC_RAB includes a MAC_ID field indicative of the ID of the terminal allocated the resource of the IC zone or the ID of the grouped terminal, a Resource_ID field indicative of the resource allocated to the terminal, an Interfering_Cell_Inform field indicative of whether the neighbor cells allocate the same resource as the Resource_ID allocated to the terminal when inter-signalling is enabled, and an Operation_Mode_Ind field indicative of the communication mode of the terminal. The Interfering_Cell_Inform field includes only the resource allocation information of every neighbor cell belonging to the active set of the terminal, or only the resource allocation information relating to a certain number of neighbor cells having the best receive signal strength. Herein, the active set indicates a set of neighbor cells to which the terminal can hand over.

When inter-signaling is not allowed, instead of the Interfering_Cell_Inform field, the IC_RAB includes an IC_Zone_Sub_Load_Inform field containing the resource allocation information of the IC zone of the cell so that the neighbor cell can acquire the resource allocation information of the cell. The IC_Zone_Sub_Load_Inform field divides the IC zone band to Q-ary subintervals using the redundancy bits of the IC_RAB and carries the resource allocation information of the subintervals.

IC_BIT in Table 1 carries resource allocation information of every resource ID of the IC zone. When inter-signaling is infeasible, each cell generates and broadcasts the IC_BIT indicative of the resource allocation information of the IC zone. The terminals allocated to the IC zone of the neighbor cell, which are traveling in the cell boundary, can receive the broadcast signal of the neighbor cell. Hence, the terminals allocated to the IC zone can acquire the resource allocation information of the IC zone of the neighbor cell from the IC_BIT information broadcast by the neighbor cell.

The IC_BIT includes a MAC_ID field indicative of the grouped ID of the terminals allocated the resource of the IC zone in each cell, and an IC_Zone_Load_Inform field including the resource allocation information of the IC zone of the cell. Herein, the MAC_ID field indicates the group of the terminals, which cancel the interference among the terminals allocated the resources of the IC zone.

In common, the resource allocation blocks include a System_Reserve field indicative of the redundancy bits of the resource allocation blocks. The Interfering_Cell_Inform field, IC_Zone_Sub_Load_Inform field, and IC_Zone_Load_Inform field each are constituted as a bit map.

When inter-signaling is feasible in the wireless communication system, the serving cell can check whether the interference signal of the neighbor cell exists through inter-signaling. Thus, the serving cell informs the terminal assigned to its IC zone of the presence or absence of the interference signal using the Interfering_Cell_Inform field of the IC_RAB in Table 1.

FIG. 1 is a diagram illustrating a construction to determine whether an interference signal exists in a wireless communication system enabling inter-signaling according to an embodiment of the present invention.

A terminal 110 in FIG. 1, which travels in a cell boundary of a serving cell 100, is allocated the resource of the IC zone. The serving cell 100 checks whether there is a neighbor cell which uses the same resource as the IC zone resource allocated to the terminal 110 by signaling with the neighbor cells.

When the neighbor cells B and D use the same resource as the IC zone resource allotted to the terminal 110, the serving cell 100 informs the terminal 110 of the presence of the interference signals from the neighbor cells B and D using the IC_RAB. For example, when the cells B, C, D and E are neighbor cells and the neighbor cells B and D use the same resource as the IC zone resource assigned to the terminal 110, the serving cell 100 constitutes the Interfering_Cell_Inform field of the IC_RAB as a bit map '1001' and transmits the field to the terminal 110. The Interfering_Cell_Inform field carries the information as to whether the interference signal exists from every neighbor cell belonging to the active set, or the information as to whether the interference signals of the neighbor cells selected based on the receive signal strength exist.

When confirming the presence of the interference signals from the neighbor cells B and D by decoding the IC_RAB, the terminal 110 performs the interference cancellation. The terminal 110 may remove all of the interference signals of the neighbor cells B and D, or only the strongest interference signal of the interference signals of the neighbor cells B and D.

Figure 2:
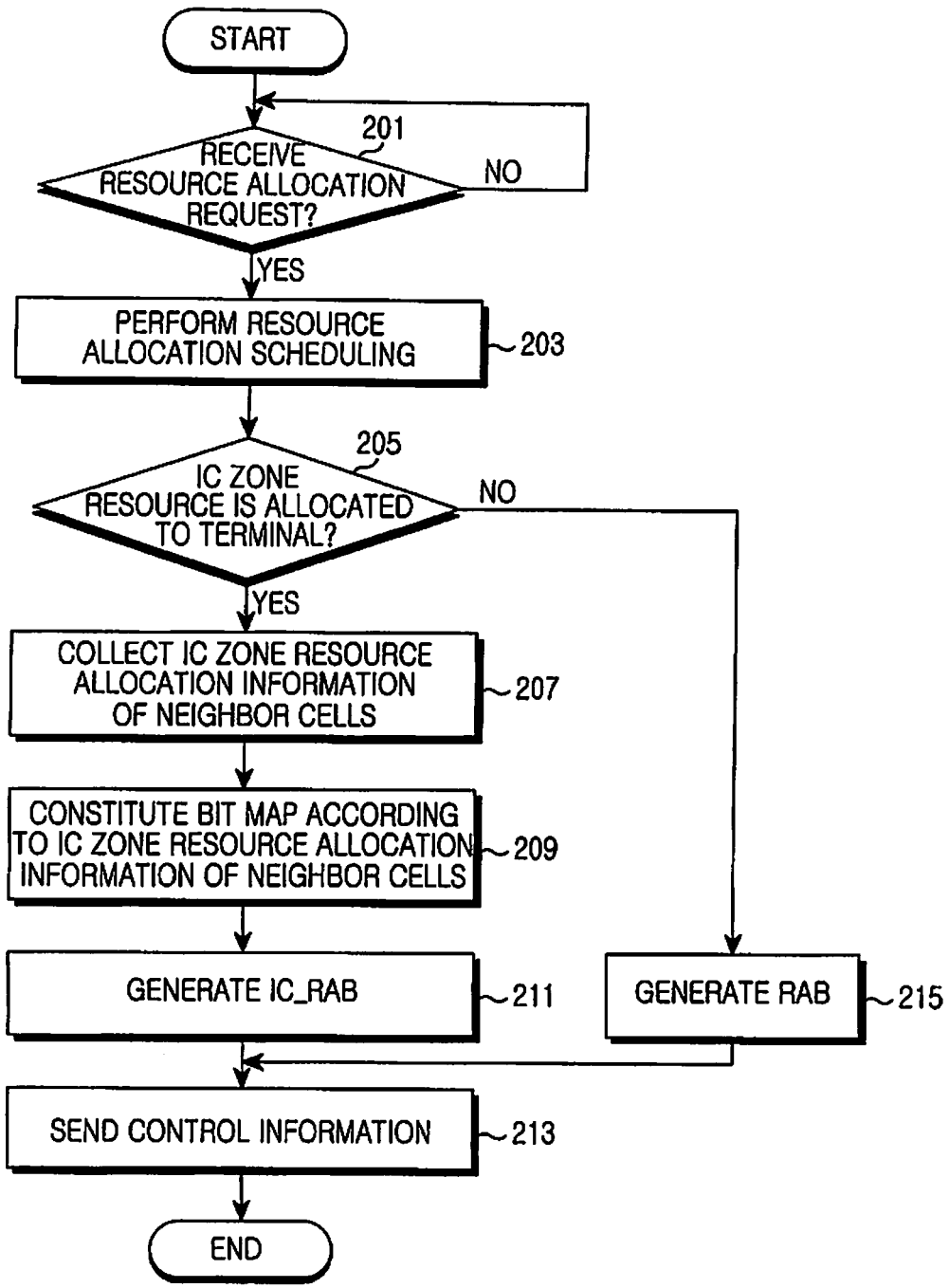
FIG. 2 is a flow diagram illustrating Base Station (BS) operation in a wireless communication system enabling inter-signaling according to an embodiment of the present invention.

FIG. 2 is a flow diagram illustrating Base Station (BS) operation in a wireless communication system enabling inter-signaling according to an embodiment of the present invention.

In FIG. 2, the BS checks whether a resource allocation request is received from the terminal in the service coverage in step 201.

When the resource allocation request signal is received from the terminal, the BS allocates the resource to the terminal through the scheduling in step 203.

Next, the BS determines whether the resource of the IC zone is allocated to the terminal in step 205.

When the resource of the IC zone is not allocated to the terminal in step 205, the BS generates RAB including the resource allocation information of the terminal in step 215.

Next, in step 213, the BS transmits the generated RAB information to the terminal.

By contrast, when the resource of the IC zone is allocated to the terminal in step 205, the BS gathers IC zone resource allocation information of the neighbor cells by signaling with the neighbor cells in step 207.

Next, in step 209, the BS constitutes a bit map indicative of whether the same resource as the IC zone resource allocated to the terminal is used by confirming the IC zone resource allocation information of the neighbor cells. More specifically, when the neighbor cell utilizes the same resource as the resource allocated to the terminal, the terminal is interfered by the neighbor cell using the same resource. Accordingly, the BS constitutes the bit map indicative of whether the neighbor cells use the same resource as the resource allocated to the terminal so that the terminal can cancel the interference only when the interference occurs. Herein, the bit map includes all the information indicative of whether the neighbor cells of the active set use the IC zone resource allocated to the terminal. Alternatively, the bit map includes the information indicative of whether the certain number of the neighbor cells selected based on the signal strength among the neighbor cells of the active set use the IC zone resource allocated to the terminal. For example, the BS constitutes the Interfering_Cell_Inform field of Table 1 including the information indicative of whether the neighbor cells use the same resource as the resource assigned to the terminal, as the bit map.

After constituting the bit map, the BS generates IC_RAB carrying the resource allocation information of the terminal and the bit map information in step 211.

In step 213, the BS transmits the IC_RAB to the terminal.

Next, the BS finishes this process.

Figure 3:
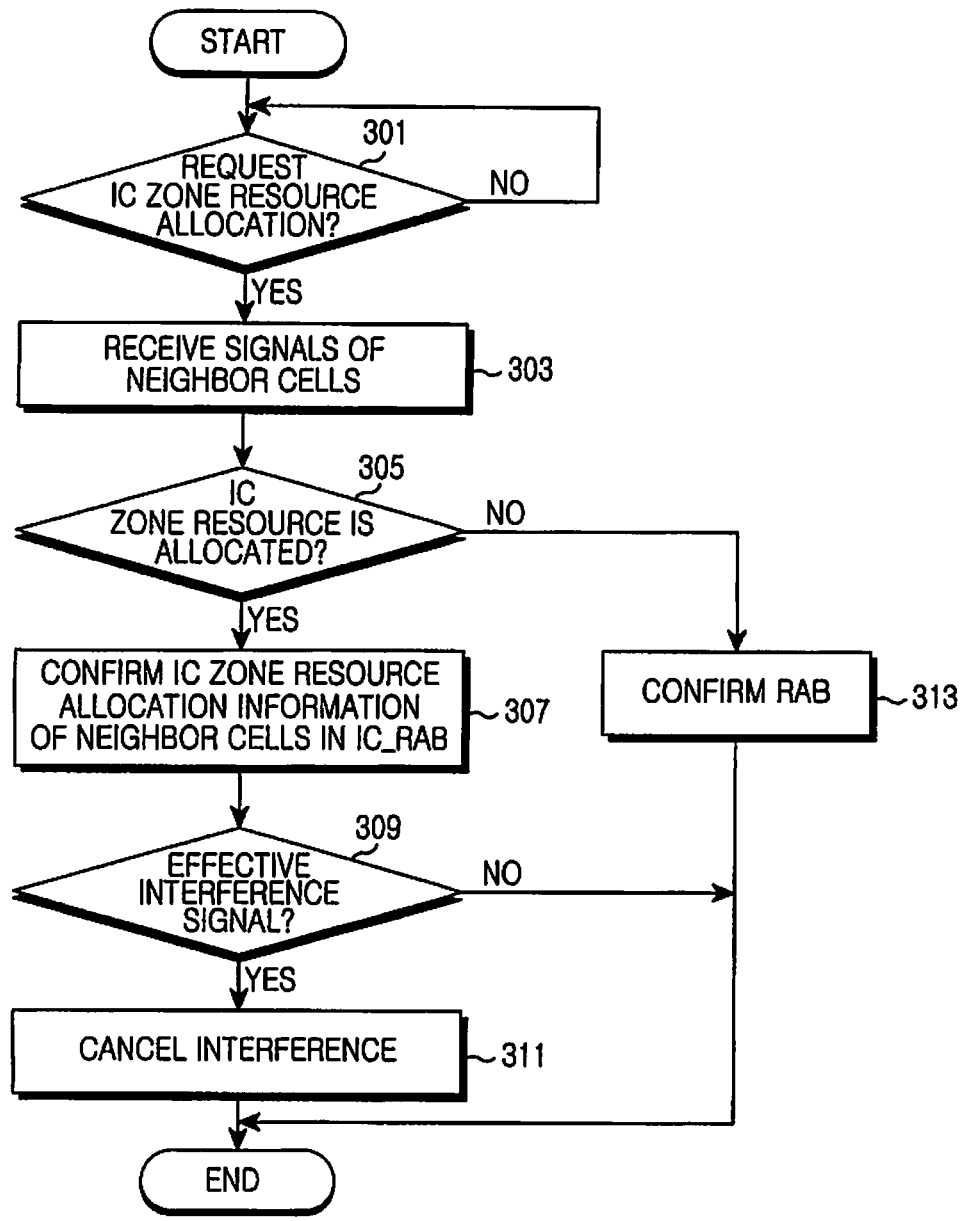
FIG. 3 is a flow diagram illustrating terminal operation in the wireless communication system enabling inter-signaling according to an embodiment of the present invention.

FIG. 3 is a flow diagram illustrating terminal operation in the wireless communication system enabling inter-signaling according to an embodiment of the present invention.

In FIG. 3, the terminal determines whether to request the IC zone resource allocation to the BS in step 301. Herein, to determine whether to request the IC zone resource allocation to the BS, the terminal uses the receive signal power difference between the serving cell and the neighbor cell or the interference signal power magnitude using the pilot. When the wireless communication system adopts the FDM scheme, the terminal determines whether to request the IC zone resource allocation to the BS using a Signal to Interference and Noise Ratio (SINR) difference between the IC zone and the other band.

After requesting the IC zone resource allocation to the BS, the terminal receives the signals from the neighbor cells in step 303.

In step 305, the terminal determines whether the IC zone resource is allocated from the BS by confirming the resource allocation information received through the control channel. That is, the terminal checks whether its IC_RAB received through the control channel from the BS exists.

When there is no IC_RAB of the terminal, the terminal confirms its allocated resource by decoding the RAB received through the control channel in step 313.

By contrast, when the IC_RAB of the terminal exists, the terminal confirms the IC zone resource information allocated from the BS by decoding the IC_RAB in step 307.

In step 309, the terminal checks whether the neighbor cell interference exists based on the Interfering_Cell_Inform field of The IC_RAB. In other words, based on the Interfering_Cell_Inform field of the IC_RAB, the terminal checks whether the neighbor cell exists which uses the same resource as the IC zone resource allocated from the BS among the neighbor cells.

When there is no neighbor cell that uses the same resource as the IC zone resource allocated from the BS, the terminal determines the absence of the neighbor cell interference and thus does not perform the interference cancellation.

By contrast, when the neighbor cell uses the same resource as the IC zone resource allocated from the BS, the terminal determines the presence of the neighbor cell interference in step 311. Thus, the terminal cancels the interference using the signals received from the neighbor cells in step 303. The terminal may remove all the interference signals or merely a preset number of the interference signals starting from the strongest interference signal.

Next, the terminal finishes this process.

When inter-signaling is infeasible in the wireless communication system, the serving cell cannot acquire the IC zone resource allocation information of the neighbor cells. In this case, the serving BS cannot inform the terminals in its service coverage of the presence of the neighbor cell interference. The terminals in the IC zone of the serving cell, which travel in the cell boundary, can receive the signals of the neighbor cells.

Accordingly, each cell generates and broadcasts IC_BIT indicative of the IC zone resource allocation information so that the terminals in the IC zone of the neighbor cell can acquire its IC zone resource allocation information. Alternatively, each cell divides the IC zone resource allocation information to the partial intervals and adds the resource allocation information of the interval including the IC zone resource allocated to the terminal when the IC zone information is allocated to the terminal in the service coverage.

Figure 4:
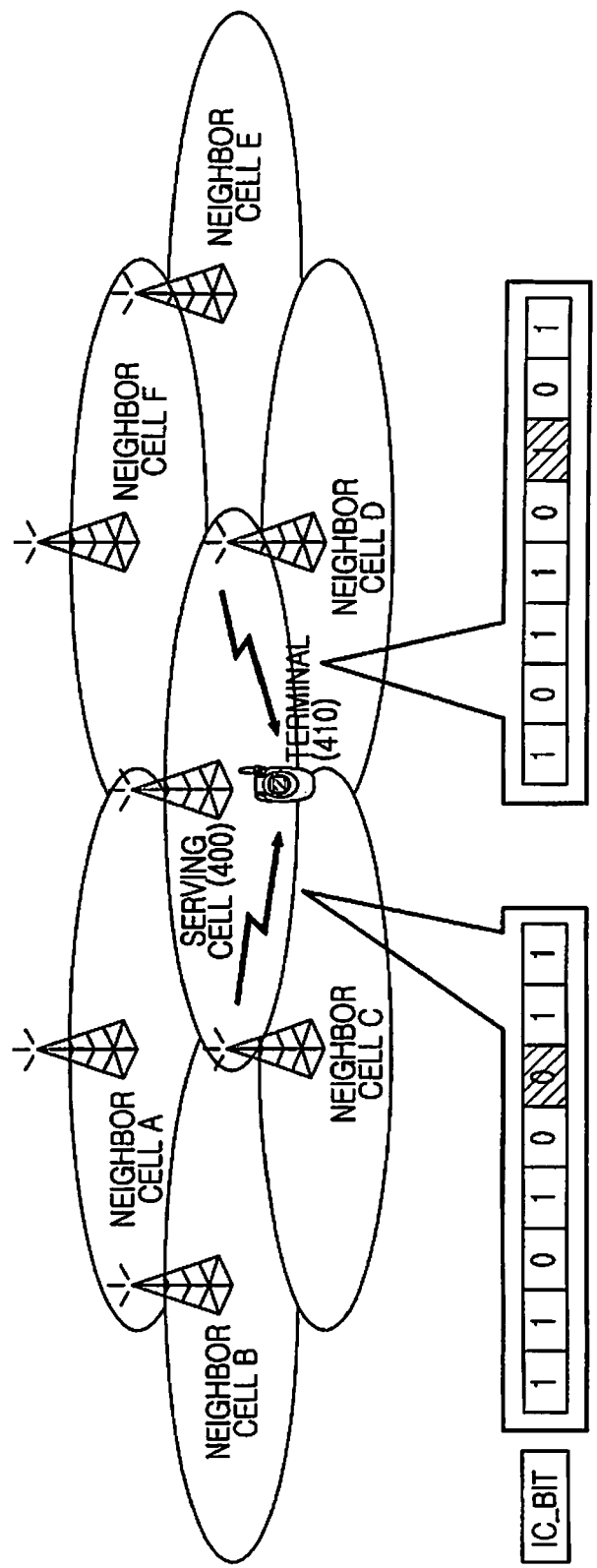
FIG. 4 is a diagram illustrating a construction for determining whether an interference signal exists in the wireless communication system disabling inter-signaling according to an embodiment of the present invention.

The wireless communication system where each cell broadcasts the IC_BIT is constituted as shown in FIG. 4.

FIG. 4 is a diagram illustrating a construction for determining whether an interference signal exists in the wireless communication system disabling inter-signaling according to an embodiment of the present invention.

A terminal 410 of FIG. 4 travels in a cell boundary of a serving cell 400 and is allocated the resource of the IC zone. The neighbor cells broadcast IC_BIT indicative of the IC zone resource allocation. The IC_BIT is a bit map including bits as many as the number of the resource IDs of the IC zone of the cells to signify the resource IDs used in the IC zone of the cells.

The terminal 410, which is traveling in the cell boundary, can receive the IC_BIT information broadcast from the neighbor cells. Hence, the terminal 410 checks whether a neighbor cell exists that uses the same resource as the IC zone resource allocated from a serving cell 400 among the neighbor cells by decoding the IC_BIT received from the neighbor cells.

When the neighbor cell uses the same resource as the IC zone resource allocated to the terminal 410 by the serving cell 400, the terminal 410 performs the neighbor cell interference cancellation. For instance, the serving cell 400 allocates the IC zone resource of the sixth resource ID to the terminal 410, IC_BIT of the neighbor cell C is 11010011, and IC_BIT of the neighbor cell D is 10110101. In this situation, the terminal 410 determines the interference from the neighbor cell D and accordingly cancels the interference of the neighbor cell D.

Figure 5:
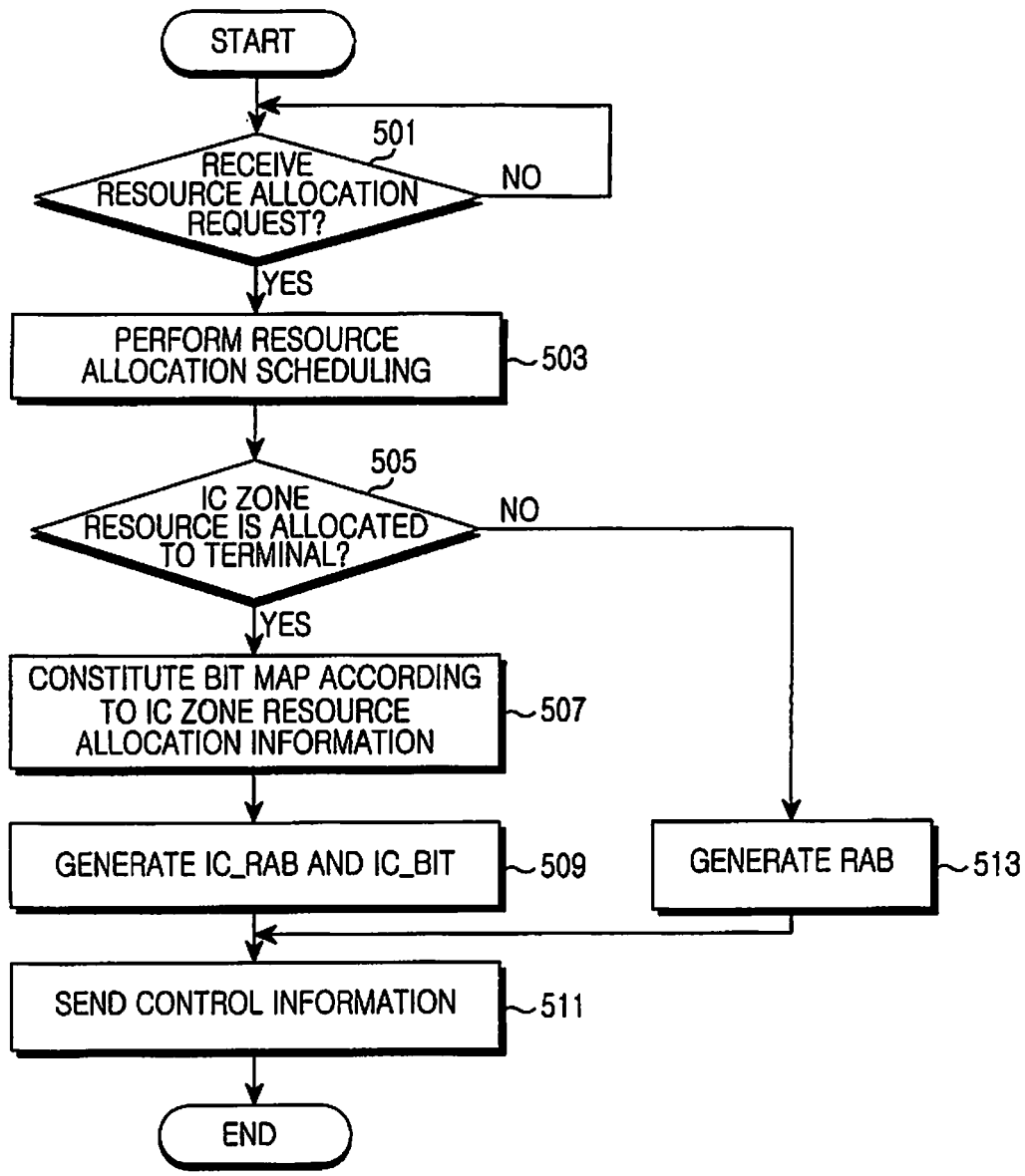
FIG. 5 is a flow diagram illustrating BS operation in a wireless communication system disabling inter-signaling according to an embodiment of the present invention.

FIG. 5 is a flow diagram illustrating a BS operation in a wireless communication system disabling inter-signaling according to an embodiment of the present invention.

The BS of FIG. 5 determines whether a resource allocation request signal is received from a terminal in step 501.

Upon receiving the resource allocation request signal from the terminal, the BS allocates the resource to the terminal through the scheduling in step 503.

In step 505, the BS determines whether the IC zone resource is allocated to the terminal.

When the IC zone resource is not allocated to the terminal, the BS generates RAB including the resource allocation information of the terminal in step 513.

Next, the BS transmits the generated RAB information to the terminal in step 511.

By contrast, when the IC zone resource is allocated to the terminal in step 505, the BS constitutes a bit map indicative of the IC zone resource allocation information in step 507. More specifically, the BS constitutes the IC_Zone_Load_Inform field contained in the IC_BIT of Table 1. Herein, the IC_Zone_Load_Inform field is the bit map indicative of whether every resource ID in the IC zone of the serving cell is used.

Next, the BS generates IC_RAB including the resource allocation information of the terminal and IC_BIT including the bit map information in step 509.

In step 511, the BS transmits the IC_RAB to the terminal and broadcasts the IC_BIT.

Next, the BS finishes this process.

Figure 6:
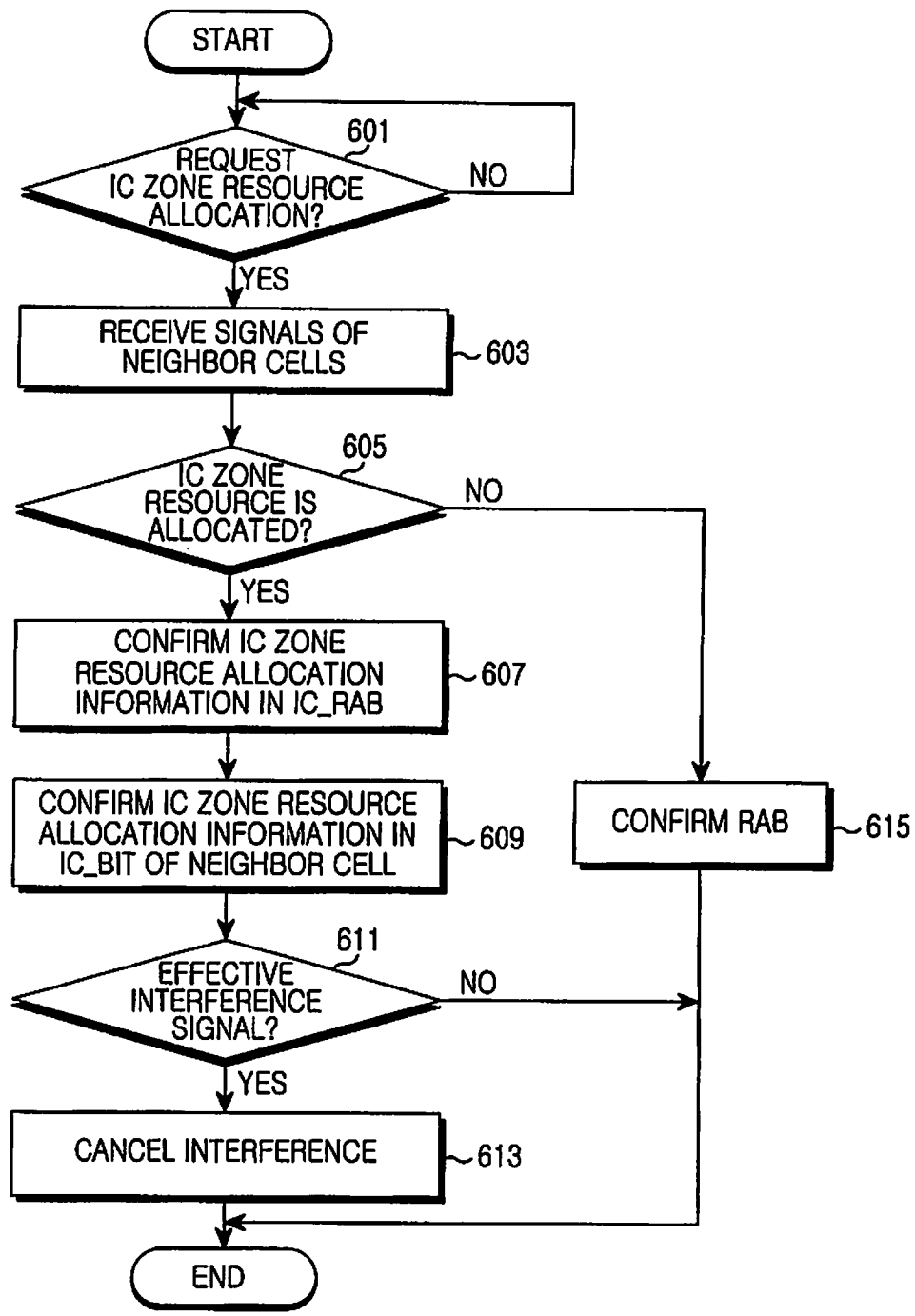
FIG. 6 is a flow diagram illustrating terminal operation in the wireless communication system disabling inter-signaling according to an embodiment of the present invention.

FIG. 6 is a flow diagram illustrating a terminal operation in the wireless communication system disabling inter-signaling according to an embodiment of the present invention.

The terminal checks whether an IC zone resource allocation is requested to a BS in step 601. To determine whether to request the IC zone resource allocation to the BS, the terminal uses the receive signal power difference between the serving cell and the neighbor cell or the interference signal power magnitude using the pilot. When the wireless communication system adopts the FDM scheme, the terminal determines whether to request the IC zone resource allocation to the BS using the SINR difference between the IC zone and the other band.

After requesting the IC zone resource allocation to the BS, the terminal receives signals from the neighbor cells in step 603.

In step 605, the terminal determines whether the IC zone resource is allocated from the BS by confirming the resource allocation information received through the control channel. That is, the terminal determines whether there is its IC_RAB received through the control channel from the BS.

When there is no IC_RAB of the terminal in step 605, the terminal confirms the resource information allocated from the BS by decoding the RAB received through the control channel in step 615.

By contrast, when there is the terminal's IC_RAB in step 605, the terminal confirms the IC zone resource allocated from the BS by decoding the IC_RAB in step 607.

In step 609, the terminal receives IC_BIT broadcast by the neighbor cells and confirms the IC zone resource allocation information of neighbor cells.

Next, the terminal determines whether an interference signal to be removed exists in step 611. More specifically, the terminal checks whether a neighbor cell which uses the same resource as the IC zone resource allocated from the BS exists by confirming the IC_Zone_Load_Inform field of the IC_BIT of the neighbor cells.

When there is no neighbor cell that uses the same resource as the IC zone resource allocated from the BS, the terminal determines the absence of the neighbor cell interference and thus does not perform interference cancellation.

By contrast, when there is a neighbor cell that uses the same resource as the IC zone resource allocated from the BS, the terminal determines the presence of the neighbor cell interference in step 613. Thus, the terminal cancels the neighbor cell interference. Herein, the terminal may remove all the interference signals or only a preset number of the interference signals starting from the strongest interference signal.

Next, the terminal finishes this process.

Meanwhile, the cells of the wireless communication system can divide the IC zone resource allocation information into partial intervals and add the resource allocation information of the partial interval covering the terminal allocated the IC zone resource, to the IC_RAB of the terminal. In this case, the wireless communication system is constituted as shown in FIG. 7.

Figure 7:
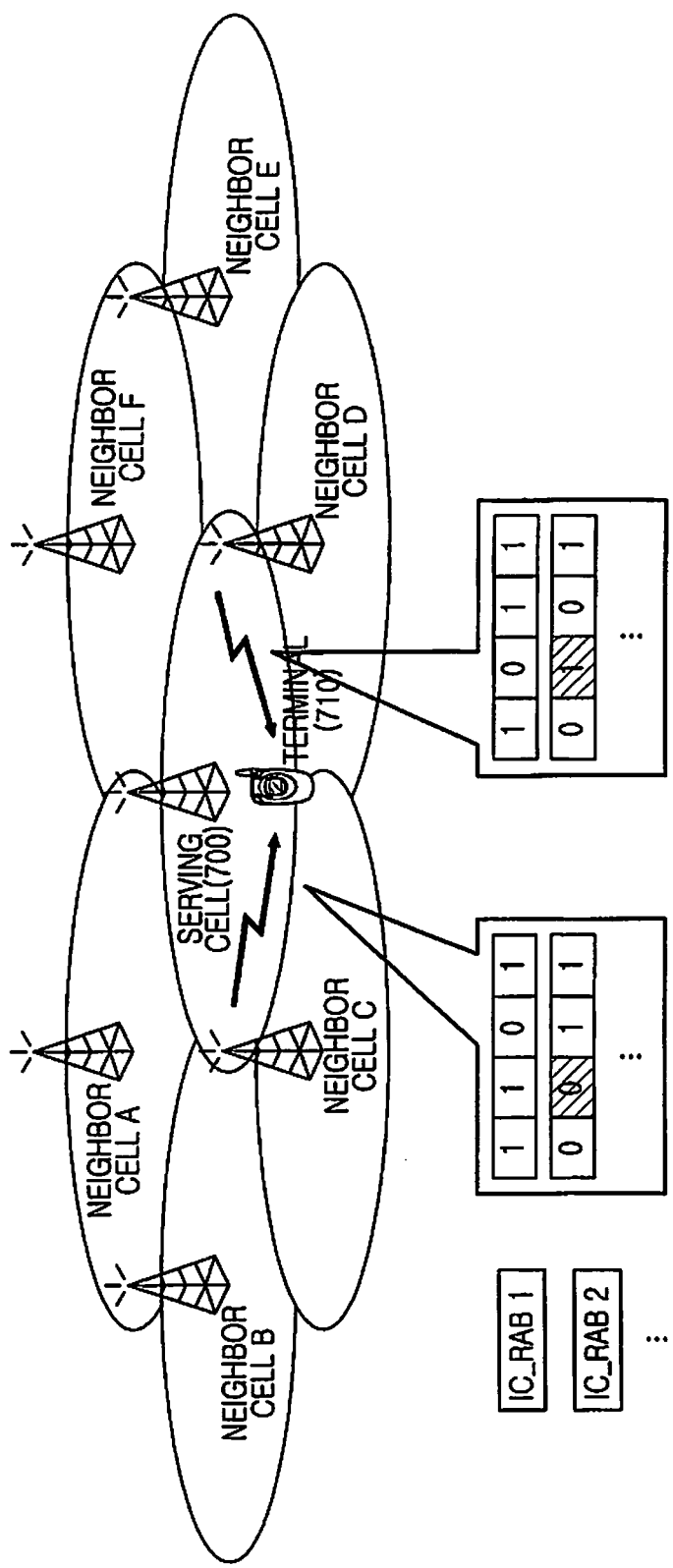
FIG. 7 is a diagram illustrating a construction for determining whether an interference signal exists in the wireless communication system disabling inter-signaling according to an embodiment of the present invention.

FIG. 7 is a diagram illustrating a construction for determining whether an interference signal exists in the wireless communication system disabling inter-signaling according to an embodiment of the present invention.

A terminal 710 in FIG. 7 travels in a service coverage of a serving cell 700 but is allocated the IC zone resource because it is in the cell boundary. The neighbor cells divides the number of the IC zone resources into Q-ary subintervals, adds the resource allocation information of the subintervals to the IC_RAB, and transmits the IC_RAB to terminals allocated to its IC zone. For instance, the neighbor cells add the resource allocation information of the subintervals to the IC_RAB in sequence. More specifically, IC_RAB 1 of the neighbor cell includes a bit map indicative of the resource allocation information of the first subinterval and IC_RAB 2 includes a bit map indicative of the resource allocation information of the second subinterval. Alternatively, the neighbor cell includes the resource allocation information of the subinterval carrying the resource ID allocated to the terminal using the IC_RAB, to the IC_RAB. Herein, the resource allocation information of the subinterval included to the IC_RAB is constituted as the bit map using the redundancy bit of the IC_RAB. For doing so, the subinterval needs to be divided into the number of resources expressible by the bit map.

Since the IC zone resources are allocated to the terminals in the cell boundary, the neighbor cells transmit the IC_RAB up to the cell boundary. The terminal 710, which is traveling in the cell boundary of the serving cell 700, can receive the IC_RAB information from the neighbor cells. The terminal 710 can check whether a neighbor cell exists that uses the same resource as the IC zone resource allocated from the serving cell 700 by decoding the IC_RAB received from the neighbor cells. For example, the IC_RAB of the neighbor cell sequentially includes the resource allocation information of the subintervals. Hence, the terminal 710 sequentially receives the IC_RAB from the neighbor cells and checks whether the neighbor cell uses the same resource ID as its allocated IC zone resource ID. Alternatively, when the cells fix the subinterval constitution scheme, the terminal 710 checks whether the IC_RAB is the n-th subinterval by confirming the resource ID of the IC_RAB of the neighbor cell. In other words, since the terminal 710 knows that the IC_RAB carries the resource allocation information of the n-th subinterval, it checks whether the neighbor cell uses the same resource ID as its allocated resource ID.

For instance, when the terminal 710 is allocated the sixth resource ID in the IC zone, it checks whether the sixth resource ID of the IC zone is used by decoding the IC_RAB received from the neighbor cells C and D. If the neighbor cell D uses the sixth resource ID, the terminal 710 recognizes the interference signal from the neighbor cell D and cancels the interference.

Figure 8:
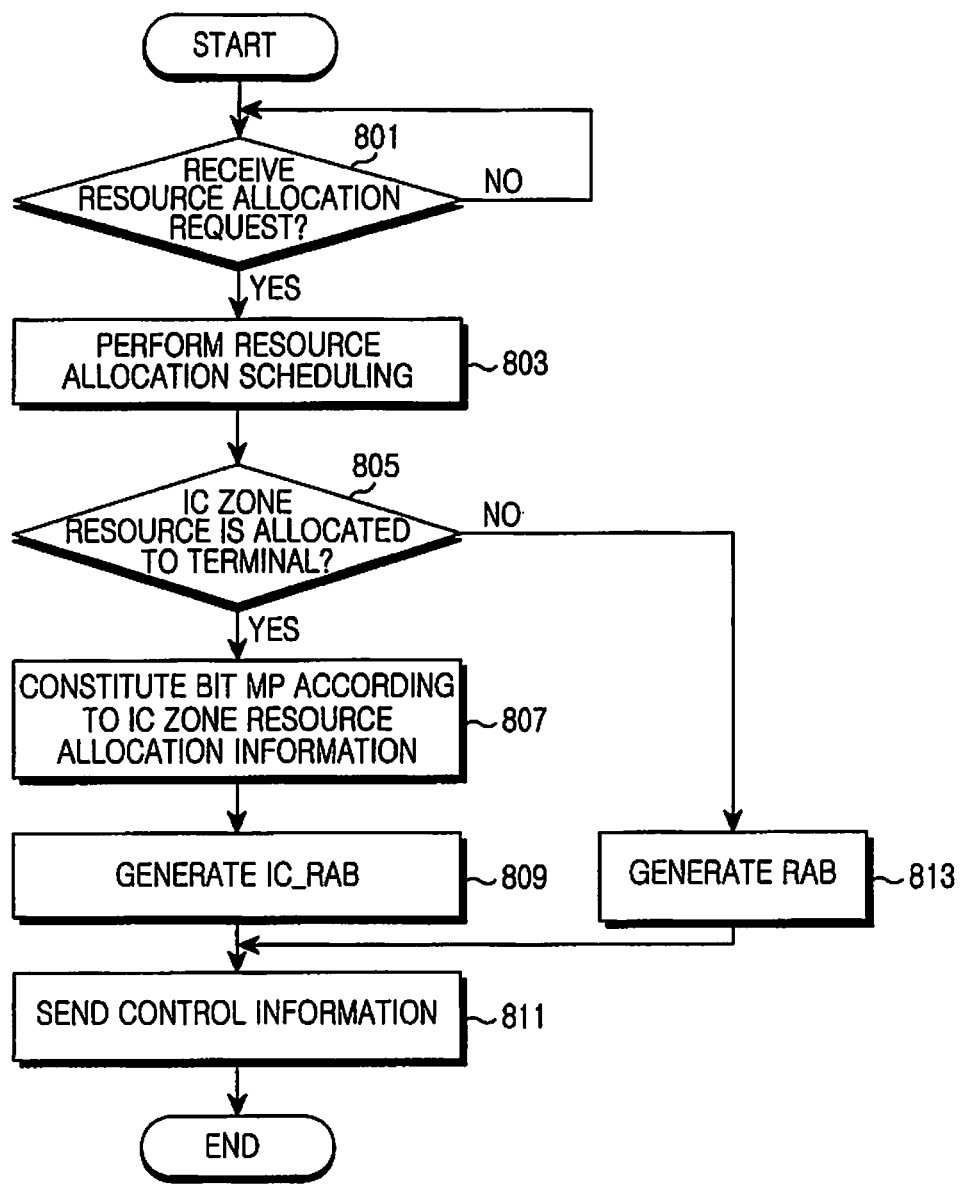
FIG. 8 is a flow diagram illustrating BS operation in a wireless communication system disabling inter-signaling according to an embodiment of the present invention.

FIG. 8 is a flow diagram illustrating a BS operation in a wireless communication system disabling inter-signaling according to an embodiment of the present invention.

The BS of FIG. 8 determines whether a resource allocation request signal is received from a terminal in step 801.

Receiving the resource allocation request signal from the terminal, the BS allocates the resource to the terminal through the scheduling in step 803.

In step 805, the BS determines whether the IC zone resource is allocated to the terminal.

When no IC resource is allocated to the terminal, the BS generates RAB including the resource information allocated to the terminal in step 813.

Next, the BS transmits the generated RAB information to the terminal in step 811.

By contrast, when the IC zone resource is allocated to the terminal in step 805, the BS divides the number of the IC zone resources to Q-ary subintervals and constitutes a bit map with the resource allocation information of each subinterval in step 807. More specifically, the BS constitutes the IC_Zone_Load_Inform field included in the IC_RAB of Table 1. The resource allocation information of the subinterval included in the IC_RAB constitutes the bit map using the redundancy bit of the IC_RAB. For doing so, the subinterval should be divided to the number of resources expressible by the bit map.

After constituting the bit map according to the resource allocation information of the subinterval, the BS generates IC_RAB including the resource allocation information of the terminal and the bit map in step 809. For example, the BS includes the bit map indicative of the resource allocation information of the first subinterval in the IC_RAB 1 and includes the bit map indicative of the resource allocation information of the second subinterval in the IC_RAB 2. Alternatively, the BS includes the resource allocation information of the subinterval carrying the resource ID of the IC_RAB.

After generating the IC_RAB, the BS transmits the IC_RAB to the terminal in step 811.

Next, the BS finishes this process.

Figure 9:
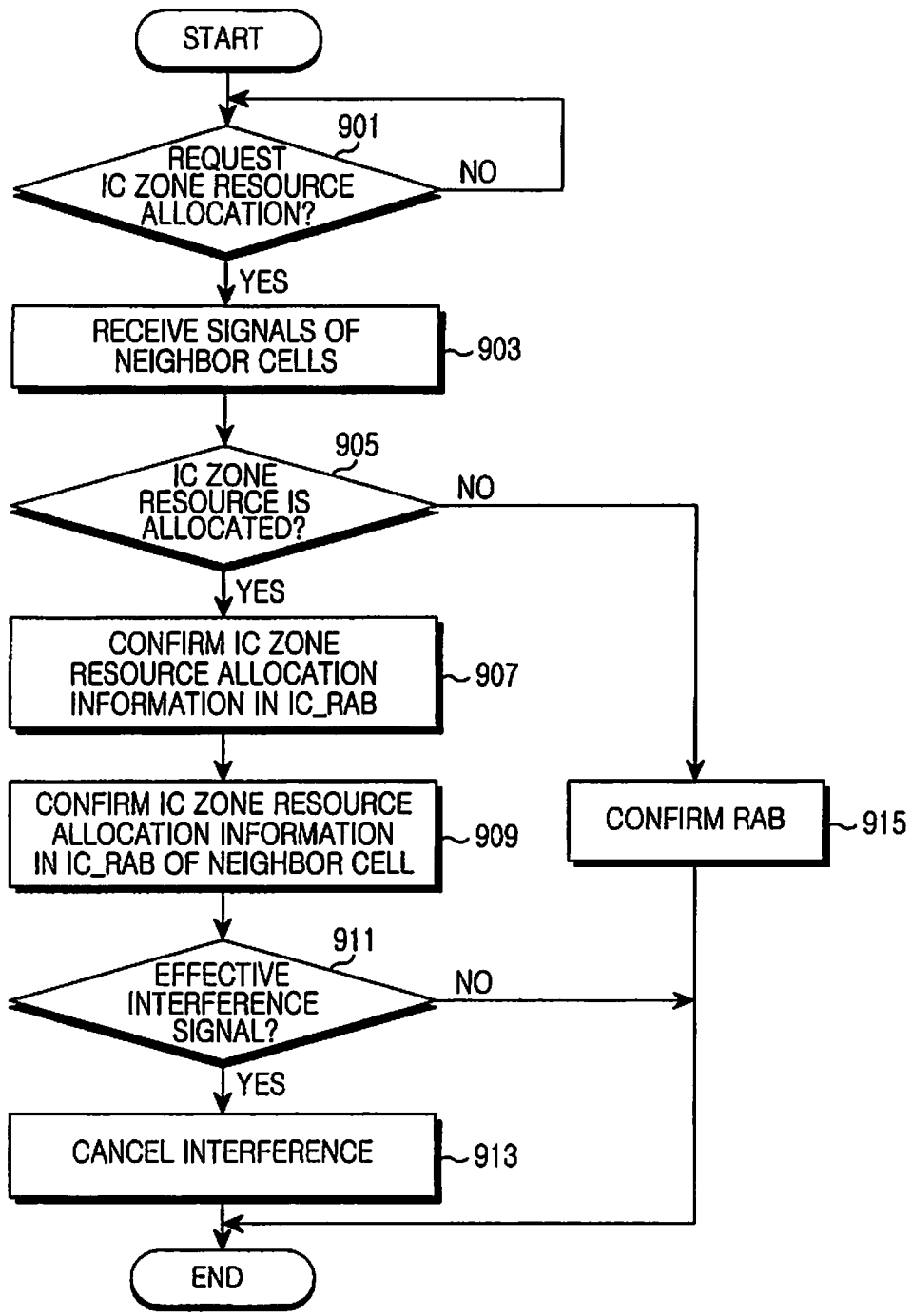
FIG. 9 is a flow diagram illustrating terminal operation in the wireless communication system disabling inter-signaling according to an embodiment of the present invention.

FIG. 9 is a flow diagram illustrating a terminal operation in the wireless communication system disabling inter-signaling according to an embodiment of the present invention.

The terminal checks whether the IC zone resource allocation is requested to the BS in step 901. To determine whether to request the IC zone resource allocation to the BS, the terminal uses the receive signal power difference between the serving cell and the neighbor cell or the interference signal power magnitude using the pilot. When the wireless communication system adopts the FDM scheme, the terminal determines whether to request the IC zone resource allocation to the BS using the SINR difference between the IC zone and the other band.

After requesting the IC zone resource allocation to the BS, the terminal receives signals from the neighbor cells in step 903.

In step 905, the terminal determines whether the IC zone resource is allocated from the BS by confirming the resource allocation information received through the control channel. That is, the terminal checks the presence of its IC_RAB received through the control channel from the BS.

When there is no IC_RAB of the terminal, the terminal confirms the resource information allocated from the BS by decoding the RAB received through the control channel in step 915.

When there is an IC_RAB of the terminal, the terminal confirms the IC zone resource information allocated from the BS by decoding the IC_RAB in step 907. Herein, the resource information indicates the resource ID of the IC zone allocated from the BS.

In step 909, the terminal confirms the IC zone resource allocation information of the neighbor cells by decoding the IC_RAB received from the neighbor cells. In more detail, the neighbor cells transmit the IC_RAB including the resource allocation information of the subinterval relating to its IC zone to the terminals assigned to its IC zone. The terminal confirms the IC zone resource allocation information of the neighbor cells by receiving and decoding the IC_RAB transmitted from the neighbor cells to the terminals allocated to its IC zone. In doing so, the terminal can confirm whether its allocated resource ID is used by sequentially decoding the IC_RAB of the neighbor cells. Also, the terminal can acquire the resource allocation information of the subinterval including its allocated resource ID by checking the subinterval of the resource ID contained in the neighbor cell IC_RAB.

After confirming the IC zone resource allocation information of the neighbor cells, the terminal determines whether the interference signal to be removed exists in step 911. More specifically, the terminal determines whether the neighbor cell exists that uses the same resource as the IC zone resource allocated from the BS by confirming the IC_Zone_Sub_Load_Inform field of the IC_RAB.

When there is no neighbor cell that uses the same resource as the IC zone resource allocated from the BS, the terminal determines the absence of the neighbor cell interference and thus does not perform the interference cancellation.

When there is the neighbor cell that uses the same resource as the IC zone resource allocated from the BS, the terminal determines the neighbor cell interference in step 913. Hence, the terminal cancels the interference.

Next, the terminal finishes this process.

As indicated above, when inter-signaling is infeasible in the wireless communication system, the terminal determines the presence or absence of the interference signal by decoding the IC_BIT or the IC_RAB of the neighbor cells. In doing so, to reduce the operation load on the terminal that decodes the control channel of the neighbor cells, the control channel is constructed as shown in FIG. 10.

Figure 10:
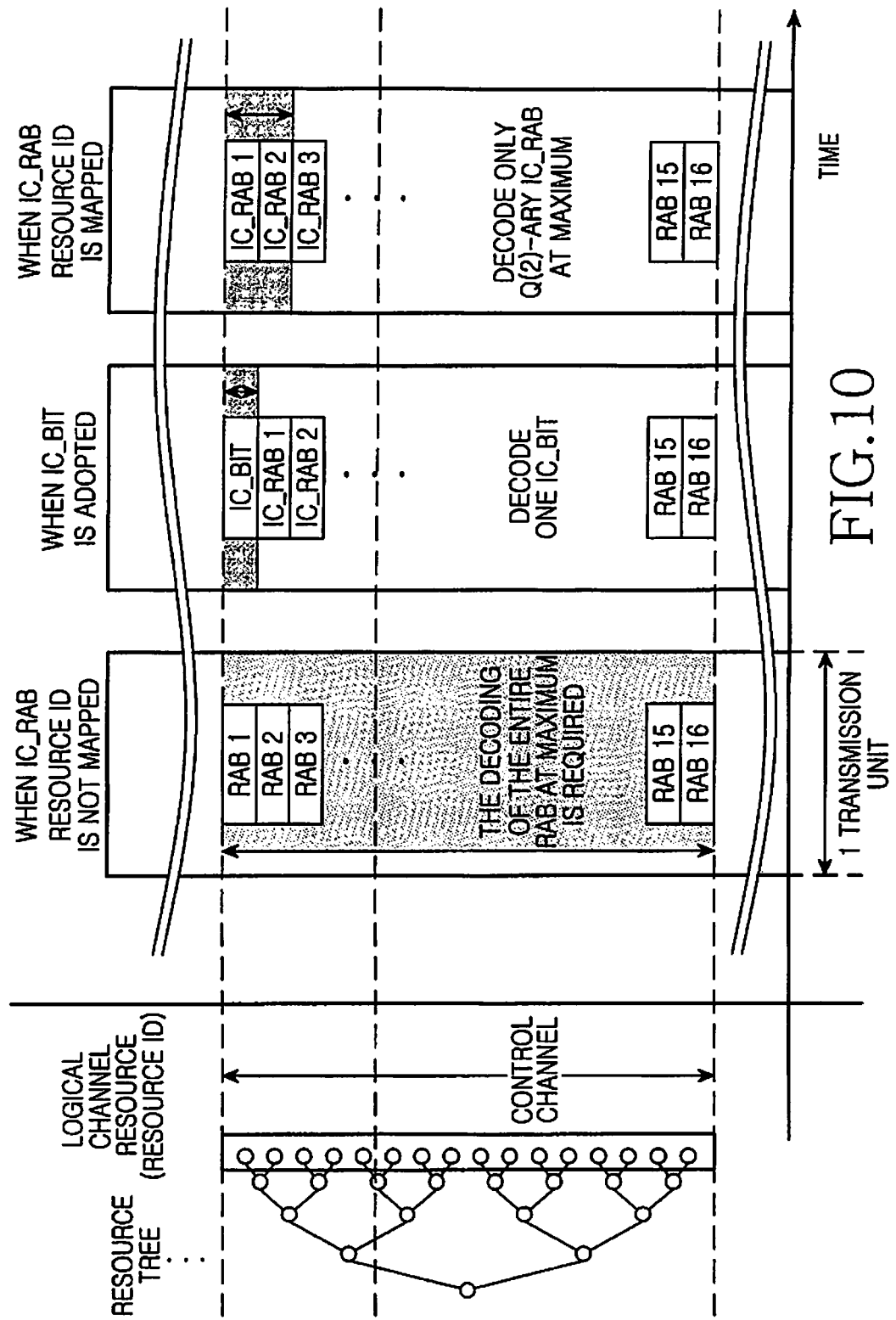
FIG. 10 is a diagram illustrating a resource ID mapping structure for an IC zone related block according to an embodiment of the present invention.

FIG. 10 is a diagram illustrating a resource ID mapping structure for the IC zone related block according to an embodiment of the present invention.

To reduce the operation load when the terminals allocated to the IC zone of the neighbor cell decode the control channel of the other cells adjacent to its cell, the cells of the wireless communication system map the resource ID such that the IC_BIT or the IC_RAB is positioned first in the control channel as shown in FIG. 10. In other words, the cells put first the IC_BIT or the IC_RAB in the control channel so that the terminals of the neighbor cell can decode the IC_BIT or the IC_RAB first.

Now, the structure of the BS which generates the resource allocation information enabling to acquire the presence or the absence of the neighbor cell interference signal and the structure of the terminal which detects the interference signal using the resource allocation information in the wireless communication system are described.

Figure 11:
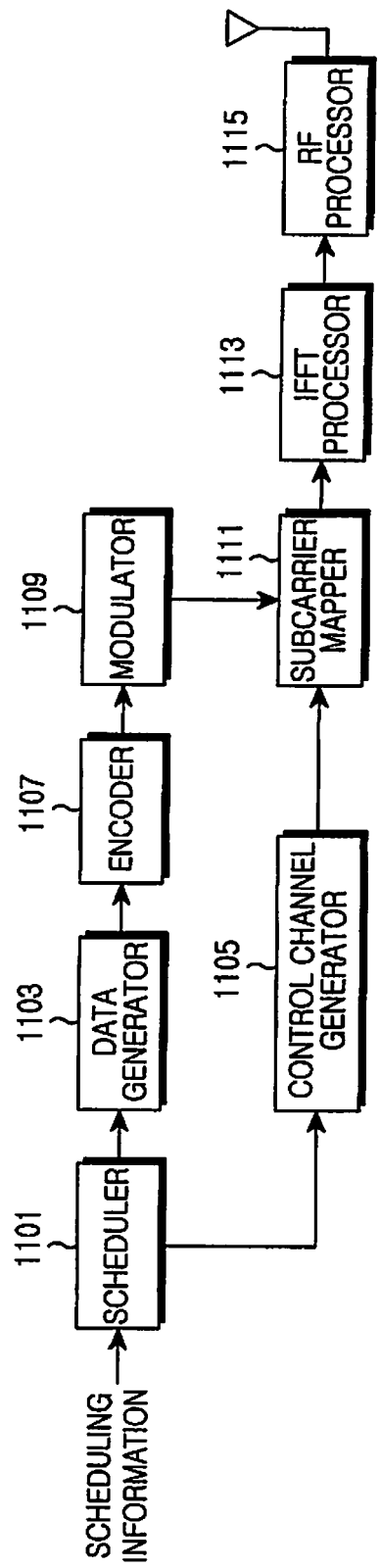
FIG. 11 is a block diagram of the BS in the wireless communication system according to and embodiment of the present invention.

FIG. 11 is a block diagram of the BS in the wireless communication system according to an embodiment of the present invention.

The BS of FIG. 11 includes a scheduler 1101, a data generator 1103, a control channel generator 1105, an encoder 1107, a modulator 1109, a subcarrier mapper 1111, an Inverse Fast Fourier Transform (IFFT) processor 1113, and a Radio Frequency (RF) processor 1115.

The scheduler 1101 determines the resource to be allocated to the terminal and the MCS level by scheduling for the service according to the scheduling information of the terminal. The scheduling information includes Quality of Service (QoS) information or channel condition information of the terminal.

The data generator 1103 generates data to be sent to the terminal according to the scheduling result provided from the scheduler 1101.

The control channel generator 1105 generates the control channel to be sent to the terminal according to the scheduling result provided from the scheduler 1101. For example, to allocate the IC zone resource to the terminal, the control channel generator 1105 generates IC_RAB constituted as shown in Table 1. To allocate a resource other than the IC zone resource to the terminal, the control channel generator 1105 generates RAB.

When the IC zone resource is allocated to the terminal and inter-signalling is allowed, the control channel generator 1105 includes to the IC_RAB the field indicative of whether the neighbor cells use the same resource as the resource allocated to the terminal.

If inter-signaling is not allowed, the control channel generator 1105 generates IC_RAB including the information of the IC zone resource allocated to the terminal and IC_BIT including the IC zone resource allocation information. Alternatively, when inter-signaling is now allowed, the control channel generator 1105 divides the IC zone resource allocation information to the subintervals and includes the resource allocation information of the subintervals to the IC_RAB in sequence. The control channel generator 1105 may include the resource allocation information of the subinterval carrying the resource ID to be allocated to the terminal using the IC_RAB, to the IC_RAB.

The encoder 1107 encodes the data fed from the data generator 1103 at a corresponding coding rate. The modulator 1109 modulates the signal encoded at the encoder 1109 according to a corresponding modulation scheme.

The subcarrier mapper 1111 maps the data fed from the modulator 1109 and the control information fed from the control channel generator 1105 to the corresponding subcarriers.

The IFFT processor 1113 IFFT-processes the frequency-domain signal provided from the subcarrier mapper 1111 and converts to a time-domain signal.

The RF processor 1115 up-converts the baseband signal fed from the IFFT processor 1113 to an RF signal and transmits the RF signal to the terminal over an antenna. At this time, the IC_BIT generated at the control channel generator 1103 is broadcast.

Figure 12:
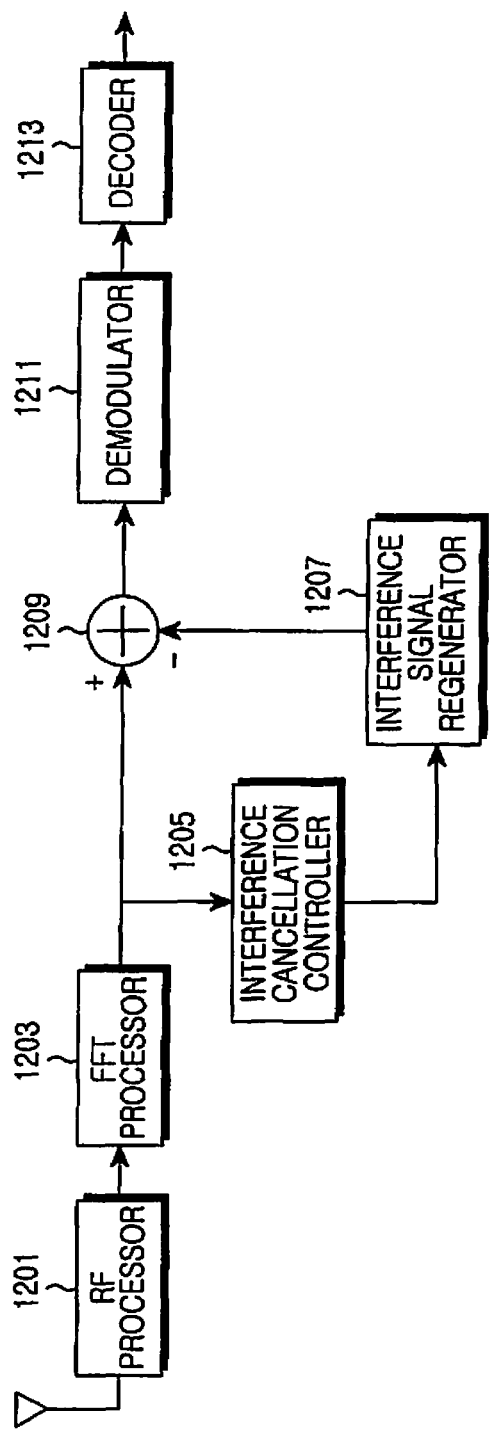
FIG. 12 is a block diagram of the terminal in the wireless communication system according to an embodiment of the present invention.

FIG. 12 is a block diagram of the terminal in the wireless communication system according to an embodiment of the present invention. Hereafter, it is assumed that only the strongest interference is canceled.

The terminal of FIG. 12 includes an RF processor 1201, a FFT processor 1203, an interference cancellation controller 1205, an interference signal regenerator 1207, a subtracter 1209, a demodulator 1211, and a decoder 1213.

The RF processor 1201 down-converts an RF signal received on an antenna to a baseband signal.

The FFT processor 1203 FFT-processes the time-domain signal fed from the RF processor 1201 and converts to a frequency-domain signal.

The interference cancellation controller 1205 determines whether to cancel the interference from the received signal using the control information provided from the FFT processor 1203. More specifically, when the IC zone resource is allocated from the serving cell, the interference cancellation controller 1205 checks whether the neighbor cell interference exists. The terminal determines whether there are the neighbor cells which use the same resource as the IC zone resource allocated from the serving cell by confirming the IC zone resource allocation information of the neighbor cells. For example, when inter-signaling is feasible, the interference cancellation controller 1205 determines whether the interference signal exists using the Interfering_Cell_Inform field of the IC_RAB received from the serving cell. When inter-signaling is infeasible, the interference cancellation controller 1205 checks whether the interference signal exists by decoding the IC_BIT broadcast by the neighbor cells. Alternatively, when inter-signaling is infeasible, the interference cancellation controller 1205 determines whether the interference signal exists using the IC_Zone_Sub_Load_Inform field of the IC_RAB received from the neighbor cell.

Depending on the presence or the absence of the neighbor cell interference, the interference cancellation controller 1205 determines whether to cancel the interference. When the neighbor cell interference is present, the interference cancellation controller 1205 controls the interference signal regenerator 1207 to cancel the interference. When the neighbor cell interference is absent, the interference cancellation controller 1205 controls the terminal not to perform the interference cancellation.

When the interference cancellation controller 1205 determines to cancel the interference, the interference signal regenerator 1207 decodes and detects the interference signal received from the neighbor cell. Next, the interference signal regenerator 1207 regenerates the received interference signal using the detected interference signal.

The subtracter 1209 removes the interference signal fed from the interference signal regenerator 1207 from the received signal fed from the FFT processor 1203.

The demodulator 1211 demodulates the signal output from the subtracter 1209 according to the corresponding modulation scheme. The decoder 1213 decodes the signal fed from the demodulator 1211 at the corresponding coding rate.

In contrast, when the interference cancellation controller 1205 determines not to perform the interference cancellation, the received signal is demodulated and decoded.

As set forth above, in the wireless communication system, the resource allocation information of the interference cancellation zone is independently constituted and the presence or absence of the neighbor cell interference signal is determined. Therefore, only when the interference is present, the interference cancellation is carried out to thus reduce the load on the terminal and enhance the reception performance thanks to the removed interference.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An operating method of a Base Station (BS) for interference cancellation in a wireless communication system, the method comprising the steps of:

gathering resource allocation information relating to an Interference Cancellation (IC) zone of neighbor cells, when a resource of the IC zone is allocated to a terminal traveling in a coverage, wherein the IC zone has a fixed Modulation and Coding Scheme (MCS) format, generating resource allocation information relating to the resource of the IC zone allocated to the terminal, wherein the resource allocation information comprises a bit map that includes information indicating whether the neighbor cells use a same resource as the resource allocated to the terminal; and transmitting the resource allocation information relating to the resource of the IC zone allocated to the terminal, to the terminal, wherein generating resource allocation information comprises:

determining whether a neighbor cell exists that uses the same resource as the resource allocated to the terminal using the resource allocation information of the IC zone of the neighbor cells;

constituting information relating to whether the neighbor cells use the same resource as the resource allocated to the terminal, as a bit map; and generating resource allocation information relating to the resource of the IC zone allocated to the terminal comprising the bit map, wherein the bit map comprises information relating to whether every cell adjacent to the BS or one or more neighbor cells selected based on a receive signal strength among the neighbor cells use the same resource as the resource allocated to the terminal.

2. The operating method of claim 1, wherein the resource allocation information relating to the resource allocated to the terminal comprises at least one of an ID of the terminal, an IC zone resource ID allocated to the terminal, a communication method of the terminal, and resource allocation information relating to the IC zone of the neighbor cells.

3. An operating method of a terminal for interference cancellation in a wireless communication system, the method comprising the steps of:

confirming an Interference Cancellation (IC) zone resource allocated from a serving cell based on resource allocation information relating to an IC zone, when the resource allocation information relating to the IC zone is received from the serving cell, wherein the IC zone has a fixed Modulation and Coding Scheme (MCS) format;

determining whether a neighbor cell exists that uses a same resource as the resource allocated from the serving cell, based on the resource allocation information; and canceling interference when the neighbor cell exists that uses the same resource as the resource allocated from the serving cell;

wherein the resource allocation information comprises a bit map that includes information indicating whether neighbor cells use the same resource as the resource allocated from the serving cell, wherein canceling interference comprises:

removing interference signals from all neighbor cells that use the same resource as the resource allocated from the serving cell or removing interference signals from neighbor cells selected based on an effect of the interference signal, when at least two neighbor cells use the same resource as the resource allocated from the serving cell.

4. An operating method of a Base Station (BS) for interference cancellation in a wireless communication system, the method comprising the steps of:

confirming resource allocation information of an Interference Cancellation (IC) zone, when an IC zone resource is allocated to a terminal traveling in a service coverage, wherein the IC zone has a fixed Modulation and Coding Scheme (MCS) forma);

generating the resource allocation information of the IC zone and separate resource allocation information relating to the resource allocated to the terminal; and sending the resource allocation information of the IC zone and the resource allocation information relating to the resource allocated to the terminal, wherein generating resource allocation information comprises:

dividing resources of the IC zone to a size smaller than or equal to a redundancy bit of the resource allocation information relating to the resource allocated to the terminal:

constituting resource allocation information of each divided interval as a bit map; and generating the resource allocation information relating to the resource allocated to the terminal comprising the resource allocation information of the divided interval, wherein generating the resource allocation information relating to the resource allocated to the terminal comprises:

sequentially including resources of the IC zone to the resource allocation information relating to the resource allocated to one or more terminals to which the resources of the IC zone are allocated, or including resource allocation information of a divided interval including the resource allocated to the terminal to the resource allocation information relating to the resource allocated to the terminal.

5. The operating method of claim 4, wherein generating resource allocation information comprises:

generating a broadcast message that carries the resource allocation information of the IC zone as a bit map; and generating the resource allocation information relating to the resource allocated to the terminal.

6. The operating method of claim 4, wherein the resource allocation information relating to the resource allocated to the terminal comprises at least one of an ID of the terminal, an IC zone resource ID allocated to the terminal, a communication method of the terminal, and resource allocation information of the divided interval.

7. The operating method of claim 4, wherein the resource allocation information of the IC zone is positioned at a front portion of a control signal indicative of allocation information of an entire radio resource.

8. An operating method of a terminal for interference cancellation in a wireless communication system, the method comprising:

confirming an Interference Cancellation (IC) zone resource allocated from a serving cell using IC zone resource allocation information received from the serving cell, wherein an IC zone has a fixed Modulation and Coding Scheme (MCS) format confirming resource allocation information of an IC zone of neighbor cells using control signals received at terminal from the neighbor cells;

determining whether a neighbor cell exists that uses the same resource as a resource allocated from the serving cell; and canceling interference when the neighbor cell exists that uses the same resource as the resource allocated from the serving cell, wherein cancelling interference comprises:

removing interference signals from one or more neighbor cells that use the same resource as the resource allocated from the serving cell or removing interference signals from neighbor cells selected based on the effect of the interference signal, when at least two neighbor cells use the same resource as the resource allocated from the serving cell.

9. The operating method of claim 8, wherein confirming resource allocation information of the IC zone of the neighbor cells comprises:

receiving resource allocation information of the IC zone, resource allocation information broadcast by the neighbor cells, and confirming the resource allocation information of the IC zone of the neighbor cells.

10. The operating method of claim 8, wherein confirming resource allocation information of the IC zone of the neighbor cells comprises:

determining whether resource allocation information of the IC zone, which is transmitted from the neighbor cells to terminals allocated resources of the IC zone of the neighbor cells, is received; and confirming resource allocation information relating to divided intervals of the IC zone from the resource allocation information of the IC zone received from the neighbor cells.

11. A wireless communication system for interference cancellation comprising:

a Base Station (BS) for allocating resources of an Interference Cancellation (IC) zone by scheduling according to scheduling information of terminals in a service coverage, wherein the IC zone has a fixed Modulation and Coding Scheme (MCS) format; and a terminal for canceling interference, when the resource of the IC zone is allocated and the terminal is interfered by neighbor cells according to resource allocation information of the IC zone of the neighbor cells, wherein the terminal cancels interference when a neighbor cell exists that uses the same resource as the resource allocated from the serving cell by checking the resource allocated from the serving cell and the resource allocation information of the IC zone of the neighbor cells in the IC zone resource allocation information received from the serving cell.

12. The wireless communication system of claim 11, wherein the BS comprises IC zone resource allocation information of the neighbor cells gathered from the neighbor cells as a bit map, wherein the IC zone resource allocation information generates resource allocation information relating to the IC zone resource allocated to the terminal, the resource allocation information comprising the bit map, and transmits the resource allocation information to the terminal.

13. The wireless communication system of claim 11, wherein the BS generates resource allocation information relating to the IC zone resource allocated to the terminal, transmits the resource allocation information to the terminal, generates and broadcasts the IC zone resource allocation information constituted as the bit map.

14. The wireless communication system of claim 11, wherein the BS divides the resources of the IC zone, constitutes resource allocation information of each divided interval as a bit map, includes the resource allocation information of the divided interval constituted as the bit map to resource allocation information relating to terminals allocated the resources of the IC zone, and transmits the resource allocation information to the terminals.

15. The wireless communication system of claim 11, wherein the terminal cancels interference when a neighbor cell exists that uses the same resource as the resource allocated from the serving cell by checking the resource allocated from the serving cell in the IC zone resource allocation information received from the serving cell and the IC zone resource allocation information of the neighbor cells in the resource allocation information received from the neighbor cells.

* * * * *

UNITED STATES PATENT AND TRADEMARK OFFICE
CERTIFICATE OF CORRECTION

| | | |
|---|---|---|
| PATENT NO. | : 8,447,310 B2 | Page 1 of 1 |
| APPLICATION NO. | : 11/936544 | |
| DATED | : May 21, 2013 | |
| INVENTOR(S) | : Tak-Ki Yu et al. | |

It is certified that error appears in the above-identified patent and that said Letters Patent is hereby corrected as shown below:

On the Title Page, Item (75) Inventors:

"Young-Ho Jung, Seoul (KR)" should be --Young-Ho Jung, Suwon-si (KR)--.

Signed and Sealed this
Twenty-eighth Day of January, 2014

Michelle K. Lee
*Deputy Director of the United States Patent and Trademark Office*